(12) United States Patent
Gupta et al.

(10) Patent No.: US 9,026,983 B2
(45) Date of Patent: May 5, 2015

(54) FLEXIBLE AND SCALABLE SOFTWARE SYSTEM ARCHITECTURE FOR IMPLEMENTING MULTIMEDIA APPLICATIONS

(71) Applicant: Ittiam Systems (P) Ltd., Bangalore (IN)

(72) Inventors: Puneet Gupta, Bangalore (IN); Sheela Prabhakar, Bangalore (IN); Nitin Nataraj, Bangalore (IN); Ashwin Iyenggar, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 95 days.

(21) Appl. No.: 13/831,966

(22) Filed: Mar. 15, 2013

(65) Prior Publication Data

US 2014/0282351 A1 Sep. 18, 2014

(51) Int. Cl.
*G06F 9/44* (2006.01)

(52) U.S. Cl.
CPC .......................................... *G06F 8/00* (2013.01)

(58) Field of Classification Search
None
See application file for complete search history.

(56) References Cited

U.S. PATENT DOCUMENTS

| | | | |
|---|---|---|---|
| 6,581,102 B1* | 6/2003 | Amini et al. | 709/231 |
| 6,662,357 B1* | 12/2003 | Bowman-Amuah | 717/120 |
| 6,721,713 B1* | 4/2004 | Guheen et al. | 705/1.1 |
| 8,856,212 B1* | 10/2014 | Jia | 709/203 |
| 2001/0052108 A1* | 12/2001 | Bowman-Amuah | 717/1 |
| 2003/0014521 A1* | 1/2003 | Elson et al. | 709/225 |
| 2005/0091672 A1* | 4/2005 | Debique et al. | 719/328 |
| 2006/0227245 A1* | 10/2006 | Poimboeuf et al. | 348/512 |
| 2008/0109727 A1* | 5/2008 | Colle et al. | 715/719 |
| 2008/0126812 A1* | 5/2008 | Ahmed et al. | 713/189 |
| 2011/0060589 A1* | 3/2011 | Weinberg | 704/251 |
| 2011/0161912 A1* | 6/2011 | Eteminan et al. | 717/101 |
| 2011/0179395 A1* | 7/2011 | Smirnov et al. | 716/126 |
| 2011/0202874 A1* | 8/2011 | Ramer et al. | 715/810 |
| 2013/0082662 A1* | 4/2013 | Carr et al. | 320/134 |
| 2014/0013313 A1* | 1/2014 | Eker et al. | 717/132 |

* cited by examiner

*Primary Examiner* — Chameli Das
(74) *Attorney, Agent, or Firm* — Prakash Nama; Global IP Services, PLLC

(57) ABSTRACT

A flexible and scalable software system architecture for implementing multimedia applications is disclosed. In one embodiment, the flexible and scalable software system architecture includes a platform abstraction layer (PAL), a device policy manager (DPM), a media engine, a library of commons (LoC) module, system management toolsets (SMT), one or more application services, an application control unit (ACU) and a user interface transaction layer (UITL). Further, the media engine is communicatively coupled between the PAL and the ACU, the LoC module is communicatively coupled to the ACU, the DPM, the media engine, the SMT, the PAL and the UITL, the DPM is communicatively coupled to the PAL, the ACU and the media engine, the ACU is coupled between media engine and the UITL, and the SMT is communicatively coupled to the ACU, the DPM, the media engine, the LoC module, the PAL and the UITL.

10 Claims, 5 Drawing Sheets

FLEXIBLE AND SCALABLE SOFTWARE SYSTEM ARCHITECTURE FOR IMPLEMENTING MULTIMEDIA APPLICATIONS

TECHNICAL FIELD

Embodiments of the present subject matter relate to multimedia applications. More particularly, embodiments of the present subject matter relate to flexible and scalable software system architecture for implementing multimedia applications.

BACKGROUND

It is often seen that multimedia systems implemented for one application, though having many elements/modules in common with the feature for another application, often find it difficult to re-use these common elements or to leverage the modules that are already productized for the first application. The time to market and the turn-around time needed for making slight variations to an existing solution, typically, becomes excessive and do not make too much business sense. Also, such modifications keep organizations from focusing on new research and development efforts and in implementing new functionality into their product lines. Existing solutions are not scalable based on functions, easier to port, and extensible based on usage scenarios.

Some of the challenges to reusing the common elements are that the range and variations in the core media functionality can be high and use cases of the end applications may combine existing features and functionality in unique ways. This may result in most of the standard media transformations, such as streaming server, streaming client, media recorder, media player, media transcoder, media preview, network player, snapshots and the like and combinations thereof, for streaming systems not being available as desired in a manner that allows fundamental reuse for fast and scalable deployment across various end applications.

For example, a surveillance application including security video camera may require the security video camera feeding live video capture into a system, which can scale, encode, packetize the first source in one format and stream it to several destinations. The same video capture may also need to be scaled, encoded, and packetized in a different format and encrypted before transmitting to some other destinations. It can be seen that there is no need for audio presence in such an application.

In another example, a surveillance application may require many security video cameras feeding live video capture into a system, which denoises and deinterlaces the live feed before it scales, encodes, packetizes all these video captures in a multi program format and streams a single encoded video stream to designated destinations. Along with the video captures, two audio sources may also need to be multiplexed into the outgoing single encoded video stream. In addition, the encoded video stream from two or more of the security video cameras may need to be recorded on to the local disk.

Although, in the above two example scenarios, many of the functional blocks are same, there are some differences that would render a simple reuse of software from one application to the other application difficult and time consuming, because the core technologies, like media processing, resource management and device handling and many others are typically configured in different usage modes based on the applications needs. The reuse can become even more challenging as the requirements for each software system evolves continuously with advancements in processor and technology development.

BRIEF DESCRIPTION OF THE DRAWINGS

Various embodiments are described herein with reference to the drawings, wherein.

The systems and methods disclosed herein may be implemented in any means for achieving various aspects. Other features will be apparent from the accompanying drawings and from the detailed description that follow.

DETAILED DESCRIPTION

Flexible and scalable software system architecture for implementing multimedia applications is disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

The terms "application", "application program" and "multimedia application" are used interchangeably throughout the document. The term "multimedia application development kit (MADK)" refers to a software development kit including elements/modules of pre-defined functionality that a software developer can use to build a multimedia application having scalable and flexible software system architecture. The term "system resource manager module (SRM)" refers to a rulebook including implementation definitions for using each of the elements/modules in realizing the multimedia application having the scalable and flexible software system architecture.

Figure 1:
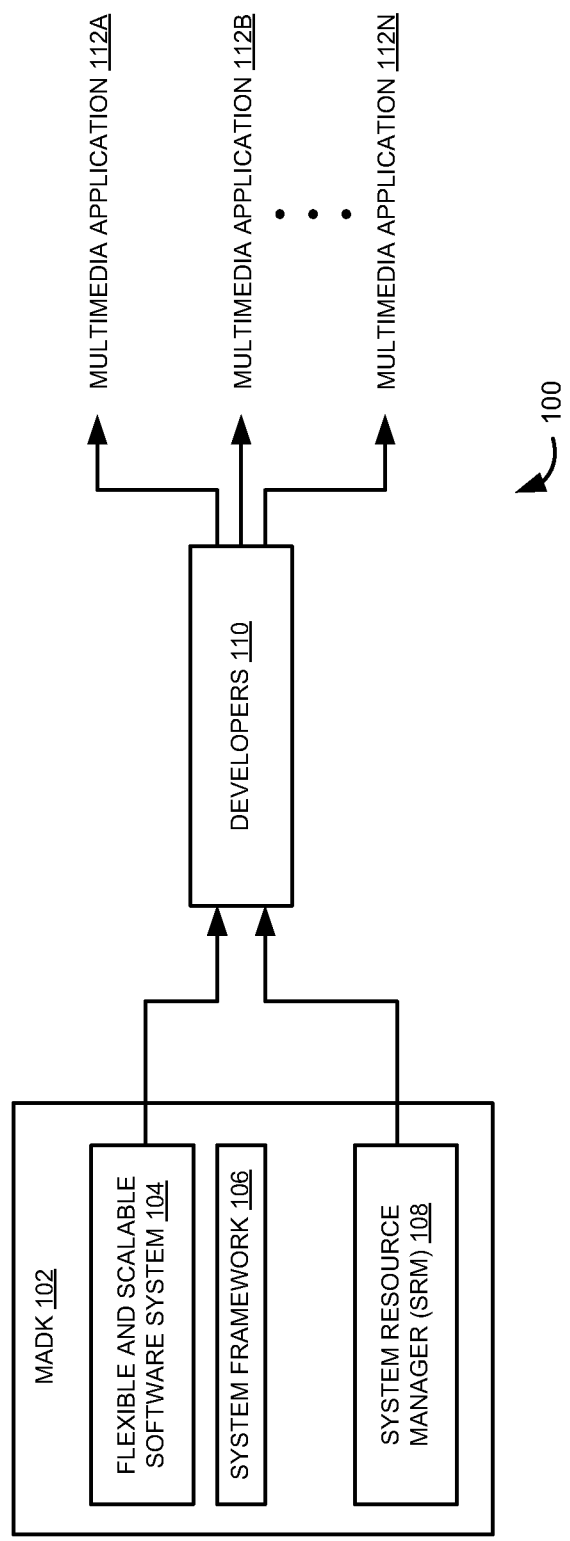
FIG. 1 is a block diagram illustrating major components of a multimedia application development kit (MADK) used by developers to implement multimedia applications, according to one embodiment.

FIG. 1 is a block diagram 100 illustrating major components of a multimedia application development kit (MADK) 102 used by developers 110 to implement one or more multimedia applications 112A-N, according to one embodiment. As shown in FIG. 1, the block diagram 100 includes the MADK 102, the developers 110 and the multimedia applications 112A-N. Further, the MADK 102 includes a flexible and scalable software system 104, a system framework 106 and a system resource manager (SRM) 108.

In one embodiment, the flexible and scalable software system 104 includes a set of core elements/modules (also referred to as atomic units). Each of the core elements has a pre-defined functionality. This is explained in more detail with reference to FIG. 2. The system framework 106 defines a set of build tools and mechanisms to assist in combining the atomic units to realize a desired multimedia application. Further, the system framework 106 provides access to each of the atomic units through a set of standardized interfaces and rules associated with the usage of the standardized interfaces. Furthermore, the system framework 106 defines behavior of each of the standardized interfaces to realize a flexible and scalable software system framework/architecture for the multimedia applications 112A-N. Moreover in this embodiment, the SRM 108 is a rulebook that defines rules to manage processes, threads and memory in the flexible and scalable software system 104.

In operation, the developers 110 use the MADK 102 and the SRM 108 to realize the multimedia applications 112A-N. In one embodiment, the developers 110 select a subset of elements needed for a multimedia application 112A using the atomic units in the flexible and scalable software system 104. Further, the selected subset of elements is combined using the system framework 106. Furthermore, the selected subset of elements and the system framework 106 are implemented based on the standardized rules defined by the SRM 108. In addition, further levels of control are allowed on the selected subset of elements by defining further needed levels of control. The further needed levels of control are allowed by defining build-time configuration options for inclusion of specific features or functionality in the selected subset of elements. The further needed levels of control are also allowed by defining run-time configuration options for allowing multiple modes of usage of the selected subset of elements across different multimedia applications 112A-N.

Figure 2:
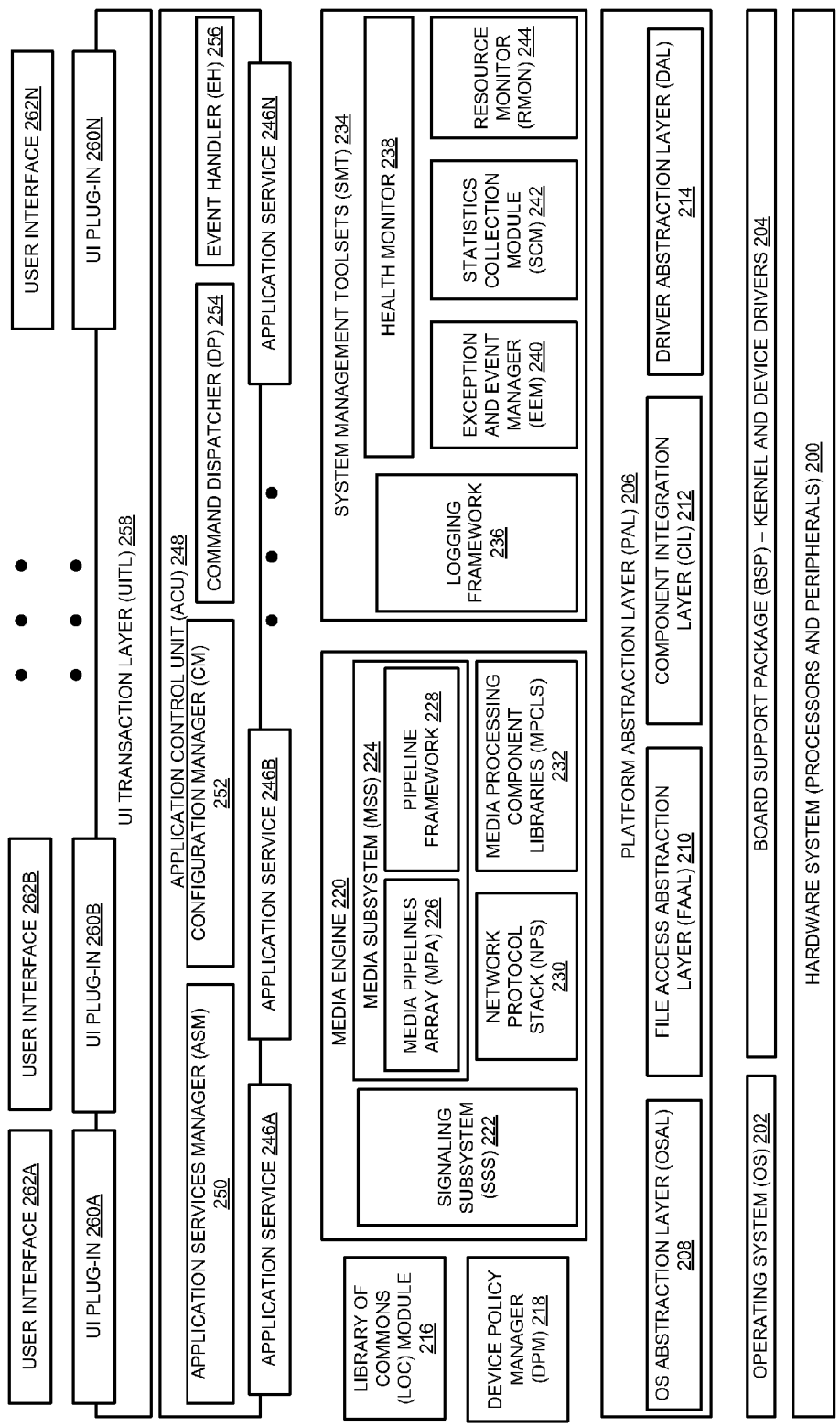
FIG. 2 is a block diagram illustrating the detailed software architecture of a flexible and scalable software system for implementing multimedia applications, according to one embodiment.

Referring now to FIG. 2, which is a block diagram illustrating detailed software architecture of the flexible and scalable software system 104 for implementing multimedia applications 112A-N, according to one embodiment. As shown, the flexible and scalable software system 104 includes a hardware system 200, an operating system (OS) 202, a board support package (BSP) 204, a platform abstraction layer (PAL) 206, a library of commons (LoC) module 216, a device policy manager (DPM) 218, a media engine 220, system management toolsets (SMT) 234, one or more application services 246A-N, an application control unit (ACU) 248, a user interface transaction layer (UITL) 258, one or more user interface (UI) plug-ins 260A-N and one or more UIs 262A-N.

Further as shown in FIG. 2, the PAL 206 includes an OS abstraction layer (OSAL) 208, a file access abstraction layer (FAAL) 210, a component integration layer (CIL) 212, and a driver abstraction layer (DAL) 214. Furthermore, the media engine 220 includes a signaling subsystem (SSS) 222, a media subsystem (MSS) 224, a network protocol stack (NPS) 230 and a media processing component libraries (MPCLs) 232. The MSS 224 further includes a media pipelines array (MPA) 226 and a pipeline framework 228 (also referred to as a media engine framework (MEF)). In addition, the SMT 234 includes a logging framework 236, a health monitor 238, an exception and event manager (EEM) 240, a statistics collection module (SCM) 242 and a resource monitor (RMon) 244. Moreover, the ACU 248 includes an application services manager (ASM) 250, a configuration manager (CM) 252, a command dispatcher (DP) 254 and an event handler (EH) 256.

Furthermore, each of the OSAL 208, the FAAL 210, the CIL 212 and the DAL 214 includes two layers, such as a standard application programming interface layer (API) (top layer) and a platform specific code layer (bottom layer). In addition, each of the UI plug-ins 260A-N includes two layers, such as a standard API layer (bottom layer) and a UI specific code layer (top layer). The key interfaces between each of the components in the flexible and scalable software system 104 are explained in detail with reference to FIG. 3.

In one embodiment, the hardware system 200 includes processors and peripherals. Further, the BSP 204 includes kernel and device drivers. Furthermore, the OS 202 includes any one of Linux®, Windows®, Android™ and the like.

In operation, the PAL 206 ensures platform portability and ease of software integration across platforms. Exemplary platforms include Linux®, Android™, Symbian®, Windows® and the like. Particularly, the OSAL 208 abstracts access semaphore, thread, mailbox, mutex, sleep and similar functionality across platforms. Further, the FAAL 210 abstracts access to file systems on various platforms and types of file systems. Furthermore, the CIL 212 abstracts component integration frameworks and interfaces defined by platform vendor and component suppliers, such as OpenMax, Codec Engine and the like. In addition, the DAL 214 abstracts access to audio video input/output (I/O), enhanced direct memory access (EDMA), pre-processing and post processing hardware elements, such as deinterlacer, resizer and the like, and other drivers the flexible and scalable software system 104 may need to interact with. The platform specific code layer in each of the OSAL 208, the FAAL 210, the CIL 212 and the DAL 214 provides standard APIs to enable a platform agnostic interface between the components in the flexible and scalable software system 104 and the hardware.

Further, the LoC module 216 provides common functions needed by other modules in one centralized place. Exemplary functions include memory management, string operations, extensible markup language (XML) creation/parsing, standard mathematical operations for fixed and floating point arithmetic and so on. In this embodiment, the LoC module 216 enables a single existence of the functions across the flexible and scalable software system 104. For example, a multimedia application can use multiple instantiations of the functions provided by the LoC module 216.

Furthermore, the DPM 218 allows simultaneous access of physical devices and peripherals to different applications and/or users within a single application. Exemplary physical devices and peripherals include an audio capture device, a video capture device, a resizer hardware, a video render device, an audio playout device and the like. For example, a media player application runs simultaneously with a gaming application using the DPM 218.

In one embodiment, the DPM 218 maps each physical channel to multiple virtual channels. Further, each virtual channel is distributed to a user. In this case, a user is a software module or entity in an application that wishes to access a virtual channel for realizing some use case functionality for the application. Further, the DPM 218 implements pre-processing and post-processing of media that benefits multiple users of a certain physical channel. For example, if virtual channels for a physical video capture source need denoising to be done before any other processing, then the DPM 218 implements the denoising before it feeds data to the virtual channels. This facilitates optimality in implementation by preventing a need to duplicate the same functionality in all the virtual channels.

Further in this embodiment, each virtual channel undergoes different media transformations as implemented by each of the users. Therefore, use cases where one input feeds multiple outputs are realized using the DPM 218. Furthermore, the DPM 218 runs in the same process or different process as the media engine 220 and ACU 248. If the DPM 218 runs in a different process, then the DPM 218 communicates with the media engine 220 and the ACU 248 via inter process communication mechanism.

Moreover, the media engine 220 provides media related processing, handling, protocol compliance and signaling functionality. In addition, the SSS 222 in the media engine 220 implements state machines for media sessions and session management for interacting with a local or remote networked devices to/from which the flexible and scalable software system 104 streams media or interacts with.

Also, the NPS 230 in the media engine 220 encompasses all network protocols and stacks needed for implementing standard compliant networking protocols for a networked multimedia system. Exemplary network protocols include hypertext transfer protocol (HTTP), real-time transfer protocol (RTP), real-time streaming protocol (RTSP), trivial file transfer protocol (TFTP) and the like. The NPS 230 provides centralized maintenance of all networked protocols in a consistent manner.

Further, the MPCLs 232 encompass all media processing algorithms for use with the other modules in the flexible and scalable software system 104. Exemplary media processing algorithms include audio/video encoder algorithm, audio/video decoder algorithm, up scaling/downscaling images algorithm, video composition algorithm, audio re-sampling algorithm, video de-noising algorithm and the like. For example, the DPM 218 and the MSS 224 use the MPCLs 232 for implementing key functionalities that process media. The MPCLs 232 also ensure consistent APIs across the DPM 218 and the MSS 224 and enable portability across various platforms where media processing libraries are uploaded for new platforms.

Furthermore, the MSS 224 realizes source-to-sink flow of media data implemented by integrating one or more algorithms from the MPCLs, the DPM and the NPS. The MPA 226 in the MSS 224 realizes preset source-to-sink flow of media data. Each of the preset source-to-sink flow of media data is referred to as a media pipeline. In this embodiment, the media pipelines are available for file server and transcoder, live server and recorder, network player and recorder, network transcoder, local or remote file playback, offline transcoder and so on. Each of the media pipelines is configurable for core functionalities as well as extended functionalities. For example, the core functionalities of the network transcoder media pipeline are to receive network streams, decode audio/video, re-encode audio/video into a different coding format or specification, and stream the coded audio/video over a network. Further, the extended functionalities can be added on a need-basis. Exemplary extended functionalities include inclusion of scaling after decoding, inclusion of metadata, handling of user data, preview of the decoded data, periodic snapshots of decoded data and the like. Furthermore, the media pipelines allow a seamless selection of the extended functionalities that enables usage across a wide range of multimedia application use cases. Therefore, the need for customization for each of the multimedia applications 112A-N is minimized.

The pipeline framework 228 in the MSS 224 provides standardized mechanisms and interfaces to implement media processing elements within each media pipeline. Exemplary mechanisms include end to end flow, connections between various processing steps, format of data flow across nodes, buffering and buffer exchange mechanism across nodes, usage of threads for node processing and resource based scheduling of the threads. Further, the pipeline framework 228 enables user and kernel space buffer usage which avoids unnecessary copying of buffer data and enables performing as many in-place computations as possible for a given platform and use case. Furthermore, the pipeline framework 228 enables a count based mechanism to allow multiple nodes in the media pipeline to use the same buffer without the need to maintain multiple copies of the buffer. In addition, the pipeline framework 228 enables queue management which involves defining configuration based rules that insert queues in between connections across the nodes which are used to manage scheduling jitters as well provides deterministic pipeline latency. Moreover, the pipeline framework 228 enables dynamic connectivity which allows connections between nodes to be rewired as the end user invokes new functionality or closes some ongoing operation. This allows for the least amount of resources to be used at any given point of time in the flexible and scalable software system 104. Also, the pipeline framework 228 enables resources based scheduling which ensures that the system threads do not waste time by periodically polling for resource availability. Further, the pipeline framework 228 allows interfaces to inject or tap media data to any media processing stage within the media pipeline. The inject and tap points enables control of the data flow in a pre-defined manner.

In addition, the SMT 234 provides functionalities to enable resource monitoring, exception, and event management, logging and collecting statistics from other modules in the flexible and scalable software system 104. The logging framework 236 in the SMT 234 allows the modules in the flexible and scalable software system 104 to log traces for diagnostic and informational purposes. The EEM 240 in the SMT 234 provides a standardized framework for the modules in the flexible and scalable software system 104 architecture to identify, report, log and handle exceptions and events. The SCM 242 in the SMT 234 provides a standardized framework to the modules in the flexible and scalable software system 104 for collecting and reporting statistics related to their operations. The RMon 244 in the SMT 234 tracks resource utilization across all processes and threads that are running as part of the flexible and scalable software system 104. The health monitor 238 interacts with the SCM 242, the EEM 240 and the RMon 244 to gather information on the current operational status of the modules in the flexible and scalable software system 104 and assesses the overall health of the flexible and scalable software system 104 based on pre-defined rules.

Also, the application services 246A-N provides highlevel functionality that integrate the features/functionality from one or more of the media engine 220, the DPM 218, the SMT 234, and the PAL 206 into a logically integrated usage by an end user. Exemplary application services 246A-N include a player service, a recorder service, a playback service and the like. In one embodiment, the application services 246A-N use one or more of the modules in the flexible and scalable software system 104 to provide a service.

Further, the ACU 248 provides standard framework to control, interface and configure the application services 246A-N. The ASM 250 in the ACU 248 monitors, interfaces and manages co-existence of all application services 246A-N as per a defined set of rules of the system framework 106. The CM 252 in the ACU 248 manages a user configuration for all application features and ensures that all software entities are synchronized with a centralized configuration pool. The DP 254 in the ACU 248 ensures user actions from a user interface are routed to an associated application service. The EH 256 in the ACU 248 manages exceptions or events that are not handled by lower entities in the flexible and scalable software system 104.

Further, the UITL 258 abstracts the usage of different types of UIs to access the functionality provided by the media engine 220. Exemplary UIs include command line UI, HTTP based web UI, QT based UI, networked protocol (for example, simple network management protocol (SNMP), open network video interface forum (ONVIF)) based UI and the like. Each UI is integrated using a custom plug-in that translates from the syntax and semantics of that UI to a standard interface exported by ACU 248. The UITL 258 accomplishes the translation and facilitates the transactions between the ACU 248 and the software UI.

Figure 3:
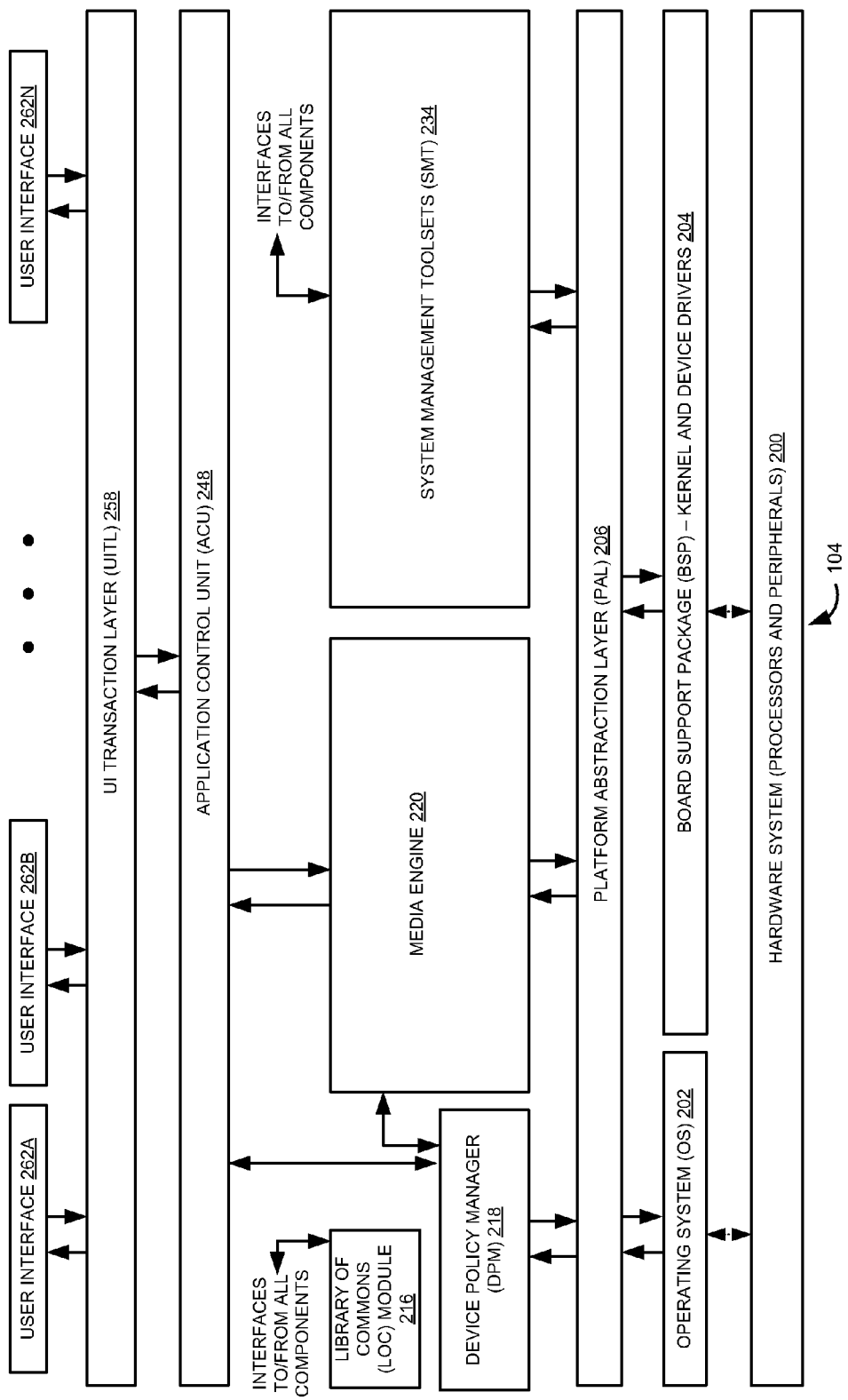
FIG. 3 is a block diagram illustrating key interfaces between major components of the flexible and scalable software system for implementing multimedia applications, according to one embodiment.

Referring now to FIG. 3, which is a block diagram illustrating key interfaces between major components of the flexible and scalable software system 104 for implementing the multimedia applications 112A-N, according to one embodiment. As shown in FIG. 3, the flexible and scalable software system 104 includes the hardware system 200, the OS 202, the BSP 204, the PAL 206, the LoC module 216, the DPM 218, the media engine 220, the SMT 234, the application services 246A-N, the ACU 248, UITL 258, and the UIs 262A-N.

Further as shown in FIG. 3, the PAL 206 is communicatively coupled to the OS 202 and the BSP 204. Furthermore, the LoC module 216 is communicatively coupled to the ACU 248, the DPM 218, the media engine 220, the SMT 234, the PAL 206 and the UITL 258. In addition, the DPM 218 is communicatively coupled to the PAL 206, the ACU 248 and the media engine 220.

Moreover, the media engine 220 is communicatively coupled to the PAL 206 and the ACU 248. Also, the SMT 234 is communicatively coupled to the ACU 248, the DPM 218, the media engine 220, the LoC module 216, the PAL 206 and the UITL 258. Further, the ACU 248 is communicatively coupled to the UITL 258. Furthermore, the UITL 258 is communicatively coupled to the UIs 262A-N. The functionality of each of the components is explained in detail with reference to FIG. 2.

Figure 4:
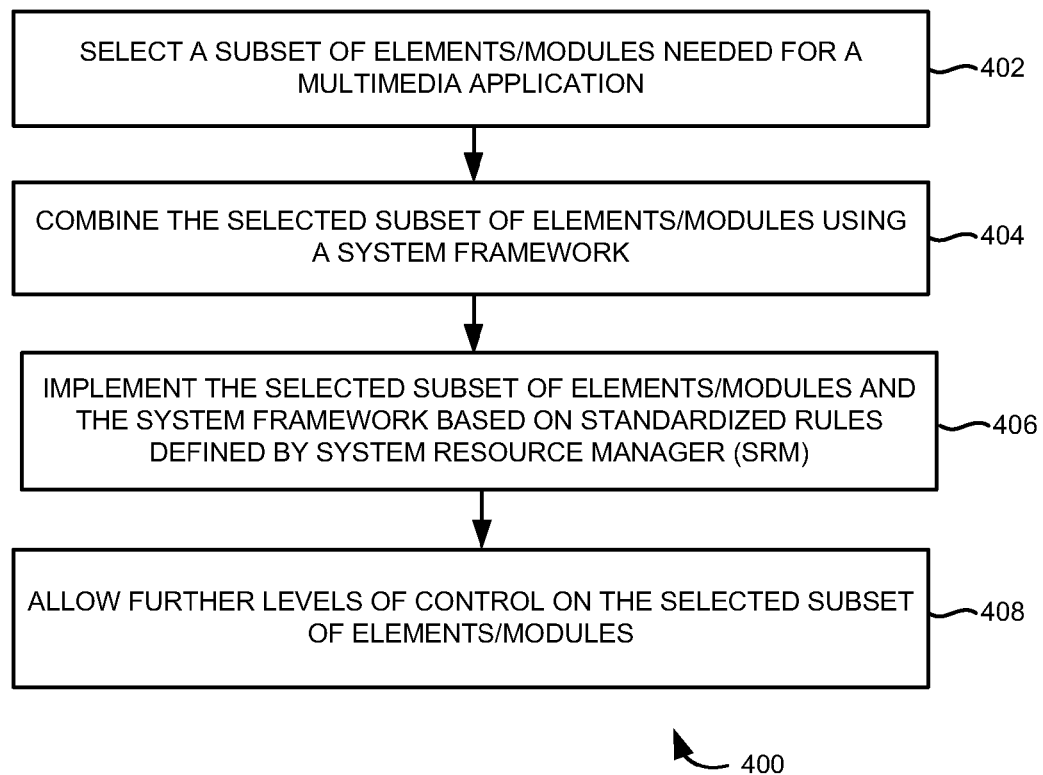
FIG. 4 illustrates a flowchart of a method for implementing multimedia applications using the MADK, such as the one shown in FIG. 1, according to one embodiment.

Referring now to FIG. 4, which illustrates a flowchart 400 of a method for implementing multimedia applications using the MADK, such as the one shown in FIG. 1, according to one embodiment. At block 402, a subset of elements/modules needed for a multimedia application is selected from a set of core elements/modules having pre-defined functionality in a flexible and scalable software system. Each of the elements/modules in the MADK has a pre-defined functionality that is not dependent on the other elements/modules in the multimedia application.

At block 404, the selected subset of elements/modules is combined using a system framework. The system framework defines a set of build tools and mechanisms to assist in combining the selected subset of elements/modules to realize a desired multimedia application. This is explained in more detail with reference to FIG. 1. In one embodiment, the obtained subset of elements/modules is combined using the set of build tools and mechanisms. Further, access to each of the subset of elements/modules is provided via a set of standardized interfaces and rules associated with usage of the each of the standardized interfaces. Furthermore, operational behavior of each standardized interface is consistently defined to realize a scalable and flexible software system framework/architecture for the multimedia application.

At block 406, the selected subset of elements/modules and the system framework are implemented based on standardized rules defined SRM. The SRM defines rules to manage processes, threads and memory in the flexible and scalable software system. At block 408, further levels of control are allowed on the selected subset of elements/modules. The further levels of control are allowed by defining build-time configuration options for inclusion of specific features or functionality in the selected subset of elements/modules. The further levels of control are also allowed by defining run-time configuration options for allowing multiple modes of usage of the selected subset of elements/modules across different multimedia applications.

Figure 5:
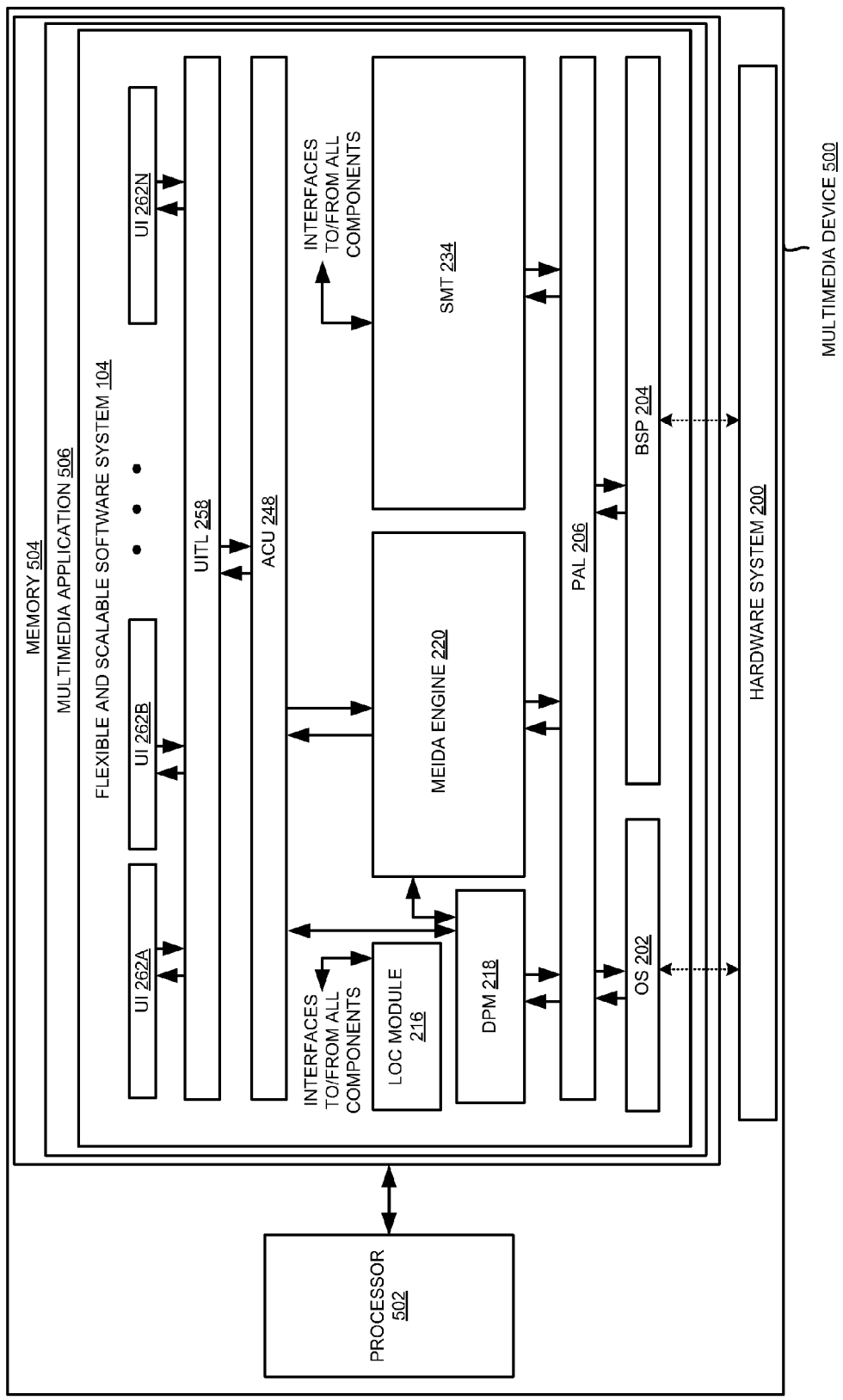
FIG. 5 shows a multimedia device including the flexible and scalable software system, such as those shown in FIGS. 2-3, implementing a multimedia application, according to one embodiment.

Referring now to FIG. 5, which shows a multimedia device 500 including the flexible and scalable software system 104, such as those shown in FIGS. 2-3, implementing a multimedia application 506, according to one embodiment. As shown in FIG. 5, the multimedia device 500 includes a processor 502 and memory 504. Further, the multimedia application 506 resides in the memory 504. Furthermore, the multimedia application 506 includes the flexible and scalable software system 104. Also, the memory 504 is operatively coupled to the processor 502.

In addition as shown in FIG. 5, the flexible and scalable software system 104 includes the hardware system 200, the OS 202, the BSP 204, the PAL 206, the LoC module 216, the DPM 218, the media engine 220, the SMT 234, the application services 246A-N, the ACU 248, UITL 258, and the UIs 262A-N.

Further as shown in FIG. 5, the PAL 206 is communicatively coupled to the OS 202 and the BSP 204. Furthermore, the LoC module 216 is communicatively coupled to the ACU 248, the DPM 218, the media engine 220, the SMT 234, the PAL 206 and the UITL 258. In addition, the DPM 218 is communicatively coupled to the PAL 206, the ACU 248 and the media engine 220.

Moreover, the media engine 220 is communicatively coupled to the PAL 206 and the ACU 248. Also, the SMT 234 is communicatively coupled to the ACU 248, the DPM 218, the media engine 220, the LoC module 216, the PAL 206 and the UITL 258. Further, the ACU 248 is communicatively coupled to the UITL 258. Furthermore, the UITL 258 is communicatively coupled to the UIs 262A-N. The functionality of each of the components is explained in detail with reference to FIG. 2.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In various embodiments, architecture described with reference to FIGS. 1 through 5 proposes the scalable and flexible implementation of multimedia applications. Further, the above architecture caters to multiple custom functional requirements. Furthermore, the above architecture enables developers to choose only the elements/modules that are needed for a multimedia application. In addition, the above architecture reduces the amount of programming time required to use in a multimedia application. Also, the above architecture allows scaling up and down the functionality and features from a master pool/kit. Moreover, the above architecture is extensible and allows users to add their own functions and also the above architecture is debug friendly via the provided analysis tools and data probes.

The above architecture allows abstraction of all platform specific software using abstraction layers for OS, drivers, framework and file-system. Further, the above architecture allows multiple applications to access physical drivers and hardware resources simultaneously by abstracting the usage of these resources from the physical device. Also, the above architecture has evolving framework to do resource based scheduling for realizing media transformations, ability to include one or more media transformations in the same project in a user selectable way, and ability to allow integration of third-party components. Furthermore, the above architecture has a centralized management of system resources and health monitoring to enable an automated way to keep track of software performance during operation. The above architecture provides dedicated elements/modules for providing application services and a framework to manage all the services provided by the elements/modules. In addition, the above architecture provides a rule-based SRM for memory, threads, and various processes running in the multimedia application program.

Although certain methods, systems, apparatus, architecture and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A multimedia system comprising:
a processor; and
memory operatively coupled to the processor, wherein the memory comprises a flexible and scalable software system architecture for building multimedia applications, the flexible and scalable software system architecture comprising:
a platform abstraction layer (PAL) operatively coupled to an operating system (OS) and a board support package (BSP) for ensuring platform portability and ease of software integration across platforms;
a device policy manager (DPM) for allowing simultaneous access of physical devices and peripherals to different applications and/or users within a single application;
a media engine for providing media related processing, handling, protocol compliance and signaling functionality;
a library of commons (LoC) module for providing common functions needed by other modules in one centralized place;
system management toolsets (SMT) for providing functionalities related to resource monitoring, exception and event management, logging and collecting statistics from the other modules;
one or more application services for providing a highlevel functionality that integrate features or functionality from one or more of the media engine, the DPM, the SMT, and the PAL into a logically integrated usage by an end user;
an application control unit (ACU) for providing a standard framework to control, interface and configure the one or more application services; and
a user interface transaction layer (UITL) for abstracting the usage of different types of user interfaces to access the functionality provided by the media engine, wherein the media engine is coupled between the PAL and the ACU, wherein the LoC module is coupled to the ACU, the DPM, the media engine, the SMT, the PAL and the UITL, wherein the DPM is coupled to the PAL, the ACU and the media engine, wherein the ACU is coupled between media engine and the UITL, and wherein the SMT is coupled to the ACU, the DPM, the media engine, the LoC module, the PAL and the UITL, wherein a subset of elements are selected from the flexible and scalable software system architecture to build the multimedia applications.

2. The architecture of claim 1, wherein the media engine comprises:
a network protocol stack (NPS) for encompassing all network protocols and stacks needed for implementing standard compliant networking protocols for a networked multimedia system;
media processing component libraries (MPCLs) for encompassing all media processing algorithms to be used by the other modules in the flexible and scalable software system;
a media subsystem (MSS) to realize source-to-sink flow of media data by integrating one or more algorithms from the MPCLs, the DPM and the NPS; and
signaling subsystem (SSS) for implementing state machines for media sessions and session management for interacting with a local or remote networked devices to/from which the flexible and scalable software system streams media or interacts with.

3. The architecture of claim 2, wherein the MSS comprises:
a media pipelines array (MPA) for realizing preset source-to-sink flow of media data, wherein each of the preset source-to-sink flow of media data is referred to as a media pipeline; and
a pipeline framework for providing standardized mechanisms and interfaces to implement media processing elements within each media pipeline.

4. The architecture of claim 1, wherein the SMT comprises:
a logging framework for allowing the modules in the flexible and scalable software system architecture to log traces for diagnostic and informational purposes;
an exception and event manager (EEM) for providing a standardized framework for the modules in the flexible and scalable software system architecture to identify, report, log and handle exceptions and events;
a statistics collection module (SCM) for providing a standardized framework to the modules in the flexible and scalable software system architecture for collecting and reporting statistics related to their operations;
a resource monitor (RMon) for tracking of resource utilization across all processes and threads that are running as part of the flexible and scalable software system architecture; and
a health monitor that interacts with the SCM, the EEM and the RMon to gather information on the current operational status of the modules in the flexible and scalable software system and assesses the overall health of the flexible and scalable software system based on pre-defined rules.

5. The architecture of claim 1, wherein the ACU comprises:
an application services manager (ASM) for monitoring, interfacing and managing co-existence of all application services as per a defined set of rules of a system framework;

a configuration manager (CM) for managing a user configuration for all application features and ensures that all software entities are synchronized with a centralized configuration pool;

a command dispatcher (DP) for ensuring user actions from a user interface are routed to an associated application service; and an event handler (EH) for managing exceptions or events that are not handled by lower entities in the flexible and scalable software system.

6. A multimedia device, comprising:

a processor; and memory operatively coupled to the processor, wherein the memory having disposed in it a flexible and scalable system software architecture for building a multimedia application, the flexible and scalable system software architecture comprises:

a platform abstraction layer (PAL) operatively coupled to an operating system (OS) and a board support package (BSP) for ensuring platform portability and ease of software integration across platforms;

a device policy manager (DPM) for allowing simultaneous access of physical devices and peripherals to different applications and/or users within a single application;

a media engine for providing media related processing, handling, protocol compliance and signaling functionality;

a library of commons (LoC) module for providing common functions needed by other modules in one centralized place;

system management toolsets (SMT) for providing functionalities related to resource monitoring, exception, and event management, logging and collecting statistics from the other modules;

one or more application services for providing a highlevel functionality that integrate features or functionality from one or more of the media engine, the DPM, the SMT, and the PAL into a logically integrated usage by an end user;

an application control unit (ACU) for providing a standard framework to control, interface and configure the one or more application services; and a user interface transaction layer (UITL) for abstracting the usage of different types of user interfaces to access the functionality provided by the media engine, wherein the media engine is coupled between the PAL and the ACU, wherein the LoC module is coupled to the ACU, the DPM, the media engine, the SMT, the PAL and the UITL, wherein the DPM is coupled to the PAL, the ACU and the media engine, wherein the ACU is coupled between media engine and the UITL, and wherein the SMT is coupled to the ACU, the DPM, the media engine, the LoC module, the PAL and the UITL, wherein a subset of elements are selected from the flexible and scalable software system architecture to build the multimedia application.

7. The multimedia device of claim 6, wherein the media engine comprises:

a network protocol stack (NPS) for encompassing all network protocols and stacks needed for implementing standard compliant networking protocols for a networked multimedia system;

media processing component libraries (MPCLs) for encompassing all media processing algorithms to be used by the other modules in the flexible and scalable software system;

a media subsystem (MSS) to realize source-to-sink flow of media data implemented by integrating one or more algorithms from the MPCLs, the DPM and the NPS; and signaling subsystem (SSS) for implementing state machines for media sessions and session management for interacting with a local or remote networked devices to/from which the flexible and scalable software system streams media or interacts with.

8. The multimedia device of claim 7, wherein the MSS comprises:

a media pipelines array (MPA) for realizing preset source-to-sink flow of media data, wherein each of the preset source-to-sink flow of media data is referred to as a media pipeline; and a pipeline framework for providing standardized mechanisms and interfaces to implement media processing elements within each media pipeline.

9. The multimedia device of claim 6, wherein the SMT comprises:

a logging framework for allowing the modules in the flexible and scalable software system architecture to log traces for diagnostic and informational purposes;

an exception and event manager (EEM) for providing a standardized framework for the modules in the flexible and scalable software system architecture to identify, report, log and handle exceptions and events;

a statistics collection module (SCM) for providing a standardized framework to the modules in the flexible and scalable software system architecture for collecting and reporting statistics related to their operations;

a resource monitor (RMon) for tracking of resource utilization across all processes and threads that are running as part of the flexible and scalable software system architecture; and a health monitor that interacts with the SCM, the EEM and the RMon to gather information on the current operational status of the modules in the flexible and scalable software system, and assesses the overall health of the flexible and scalable software system based on pre-defined rules.

10. The multimedia device of claim 6, wherein the ACU comprises:

an application services manager (ASM) for monitoring, interfacing and managing co-existence of all application services as per a defined set of rules of a system framework;

a configuration manager (CM) for managing a user configuration for all application features and ensures that all software entities are synchronized with a centralized configuration pool;

a command dispatcher (DP) for ensuring user actions from a user interface are routed to an associated application service; and an event handler (EH) for managing exceptions or events that are not handled by lower entities in the flexible and scalable software system.

* * * * *